US012573091B2

(12) United States Patent
    Cantadori et al.

(10) Patent No.: US 12,573,091 B2
(45) Date of Patent: Mar. 10, 2026

(54) SYSTEM AND METHOD OF CALIBRATING AN OPTICAL SENSOR MOUNTED ON BOARD OF A VEHICLE USING A GRADUATED MOUNTING BAR

(71) Applicant: Mahle Aftermarket Italy S.p.A., Parma (IT)

(72) Inventors: Andrea Cantadori, Parma (IT); Tiberio Scaramuzza, Parma (IT)

(73) Assignee: MAHLE AFTERMARKET ITALY S.P.A. (IT)

( * ) Notice: Subject to any disclaimer, the term of this patent is extended or adjusted under 35 U.S.C. 154(b) by 619 days.

(21) Appl. No.: 17/943,738

(22) Filed: Sep. 13, 2022

(65) Prior Publication Data
    US 2023/0005183 A1      Jan. 5, 2023

Related U.S. Application Data

(63) Continuation-in-part of application No. 17/701,362, filed on Mar. 22, 2022, which is a continuation of (Continued)

(30) Foreign Application Priority Data
    Jun. 21, 2018     (EP) ..................................... 18178983

(51) Int. Cl.
    *G06T 7/80*          (2017.01)
    *B60R 11/04*         (2006.01)
                (Continued)

(52) U.S. Cl.
    CPC ................ *G06T 7/80* (2017.01); *B60R 11/04* (2013.01); *G01S 7/4021* (2013.01); (Continued)

(58) Field of Classification Search
    None
    See application file for complete search history.

(56) References Cited

U.S. PATENT DOCUMENTS 5,748,505 A      5/1998  Greer
9,217,914 B2    12/2015  Choi
              (Continued)

FOREIGN PATENT DOCUMENTS

DE            10246066 A1     4/2004
DE        102009028606 A1     2/2011
              (Continued)

*Primary Examiner* — James J Lee
*Assistant Examiner* — Tawri M McAndrews
(74) *Attorney, Agent, or Firm* — Fishman Stewart PLLC

(57) ABSTRACT

A system and method for calibrating a vehicle optical sensor includes positioning the vehicle in a test station having a projection surface in view of the optical sensor, positioning targets on two hubs of the vehicle, and positioning lasers left to right that are mounted on a graduated mounting bar in front of the vehicle. The graduated mounting bar includes gradations indicative of a lateral position of the lasers on the graduated mounting bar. The lasers are configured to obtain a distance to the targets and distances along respective axes and between the lasers. The calibration is performed based on the obtained distances and once the vehicle's position in the test station is known with respect to the test station.

18 Claims, 9 Drawing Sheets

Related U.S. Application Data application No. 16/447,918, filed on Jun. 20, 2019, now abandoned.

(51) Int. Cl.

| | | |
|---|---|---|
| *G01S 7/40* | (2006.01) | |
| *G01S 7/497* | (2006.01) | |
| *G01S 13/931* | (2020.01) | |
| *G01S 17/931* | (2020.01) | |
| *G07C 5/08* | (2006.01) | |
| *H04N 9/31* | (2006.01) | |

(52) U.S. Cl.

CPC .......... *G01S 7/4972* (2013.01); *G01S 13/931* (2013.01); *G01S 17/931* (2020.01); *G07C 5/0808* (2013.01); *G07C 5/0841* (2013.01); *H04N 9/3185* (2013.01); *B60R 2300/402* (2013.01); *G06T 2207/30252* (2013.01)

(56) References Cited

U.S. PATENT DOCUMENTS

| | | | |
|---|---|---|---|
| 9,247,222 B2 | 1/2016 | Sieler | |
| 9,794,552 B1 | 10/2017 | Ribble | |
| 10,089,753 B1 | 10/2018 | Fegyver | |
| 10,788,316 B1 | 9/2020 | Kalscheur | |
| 10,788,400 B2 | 9/2020 | Stieff | |
| 10,935,465 B1 | 3/2021 | Stieff | |
| 10,942,045 B1 | 3/2021 | Crawford | |
| 11,172,193 B1* | 11/2021 | Reddy ................. H04N 23/633 | |
| 2001/0012985 A1 | 8/2001 | Okamoto | |
| 2004/0133376 A1 | 7/2004 | Uffenkamp | |
| 2006/0164295 A1 | 7/2006 | Focke | |
| 2007/0099700 A1* | 5/2007 | Solomon ............. G07F 17/3211 | |
| | | | 463/34 |
| 2010/0238291 A1 | 9/2010 | Pavlov | |
| 2010/0245592 A1 | 9/2010 | Inui | |
| 2011/0032215 A1 | 2/2011 | Sirotich | |
| 2013/0257822 A1 | 10/2013 | Holmgren | |
| 2013/0325252 A1 | 12/2013 | Schommer | |
| 2014/0233023 A1 | 8/2014 | Soininen | |
| 2014/0320658 A1 | 10/2014 | Pliefke | |
| 2015/0049193 A1 | 2/2015 | Gupta | |
| 2015/0134191 A1 | 5/2015 | Kim | |
| 2015/0145999 A1 | 5/2015 | Kim | |
| 2016/0161602 A1 | 6/2016 | Prokhorov | |
| 2016/0298930 A1* | 10/2016 | Squire ................... F41G 3/2655 | |
| 2017/0054974 A1 | 2/2017 | Pliefke | |
| 2017/0322048 A1 | 11/2017 | Yoshida | |
| 2017/0332052 A1 | 11/2017 | Lu | |
| 2018/0052223 A1 | 2/2018 | Stieff | |
| 2018/0067198 A1 | 3/2018 | Valois | |
| 2018/0100783 A1 | 4/2018 | Stieff | |
| 2018/0188022 A1* | 7/2018 | Leikert ............. G01B 11/2755 | |
| 2019/0132560 A1* | 5/2019 | Grosse ................. H04N 17/002 | |
| 2019/0180475 A1 | 6/2019 | Nash | |
| 2019/0204425 A1 | 7/2019 | Abari | |
| 2019/0331482 A1 | 10/2019 | Lawrence | |
| 2019/0392610 A1* | 12/2019 | Cantadori ............. G01B 21/04 | |
| 2020/0239010 A1* | 7/2020 | Corghi ....................... B60S 5/00 | |
| 2020/0361459 A1* | 11/2020 | Qiu ....................... B60W 10/00 | |
| 2021/0197841 A1 | 7/2021 | Barcin | |
| 2021/0285760 A1* | 9/2021 | Su ............................. G06T 7/73 | |

FOREIGN PATENT DOCUMENTS

| | | |
|---|---|---|
| DE | 102015118874 A1 | 5/2017 |
| EP | 1260832 A1 | 11/2002 |
| EP | 1376051 A1 | 1/2004 |
| EP | 3084348 A2 | 10/2016 |
| EP | 3329294 A1 | 6/2018 |
| EP | 3655796 A1 | 5/2020 |
| GB | 2396005 A | 6/2004 |
| WO | 2014192347 A1 | 12/2014 |
| WO | 2015092594 A2 | 6/2015 |
| WO | 2015092594 A3 | 6/2015 |
| WO | 2017016541 A1 | 2/2017 |
| WO | 2018067354 A1 | 4/2018 |
| WO | 2019015847 A1 | 1/2019 |

\* cited by examiner

SYSTEM AND METHOD OF CALIBRATING AN OPTICAL SENSOR MOUNTED ON BOARD OF A VEHICLE USING A GRADUATED MOUNTING BAR

CLAIM FOR PRIORITY

This application is Continuation-In-Part (CIP) of U.S. application Ser. No. 17/701,362, which was filed on Mar. 22, 2022, which is a Continuation of U.S. application Ser. No. 16/447,918 filed on Jun. 20, 2019 and now abandoned, which claims priority to European Application No. 18178983.5, which was filed on Jun. 21, 2018, the contents of which are fully incorporated by reference herein in their entirety.

FIELD

The subject matter described herein relates to a system and method of calibrating an optical sensor mounted on board of a vehicle.

BACKGROUND

Over recent years, the attention of those developing the safety of motor vehicles has extended from the traditional passive safety systems (airbags, seat belts, impact resistance, etc.) to advanced active safety systems, known to specialists as Advanced Driver Assistance Systems ADAS.

ADAS are electronic driving assistance systems for vehicles that support the driver for the purpose of increasing safety and/or driving comfort. Such systems have been classified into six levels according to the degree of autonomy, as indicated below:

Level 0 (no automation): the driver is in charge of all the driving aspects, even when he/she is facilitated by the systems installed on board of the vehicle.

Level 1 (driver assistance): in some situations the vehicle can accelerate, brake or steer autonomously, but the driver must be ready at all times to regain control of the vehicle.

Level 2 (partial automation): the vehicle has full control of the accelerator, brake and steering, but the driver must still monitor the surrounding environment.

Level 3 (conditioned automation): the vehicle has full control of the accelerator, brake, steering and monitoring of the environment, but the driver must be ready to intervene if required by the system.

Level 4 (high automation): the automatic system is able to handle any event, but must not be activated in extreme driving conditions such as in bad weather.

Level 5 (complete automation): the automatic driving system is able to handle all driving situations; there is no longer any need for intervention by a human driver.

Currently, vehicles are often equipped with level 3 systems. The objective over coming years is to reach level 5.

By way of example, ADAS that are already widespread include adaptive cruise control, automatic full-beam headlamp adjustment, automatic headlamp orientation, automatic parking system, navigation system with traffic information, night vision system, blind spot monitor, frontal collision warning system, automatic emergency braking, etc.

At the technological level, ADAS are based on sensors (e.g., television cameras, radar, Lidar, etc.) able to detect different information that can possibly be used as the input data for a smart algorithm that oversees the degree of autonomy of the vehicle.

Before the vehicle is placed on the market, the sensors are typically calibrated directly by the manufacturer. For example, the initial calibration of a television camera is performed through a simulation environment specifically provided by the manufacturer in which the television camera is placed opposite a monitor onto which settable dynamic scenarios are projected (e.g. a pedestrian crossing the road).

After the vehicle has been placed on the market, the sensors are calibrated periodically (e.g. when the vehicle is serviced) or after exceptional events (e.g., replacement of the sensor following a defect, damage due to an accident, or if there is breakdown warning).

Often, ADAS include features that include manual measurement of various features of the vehicle being calibrated and/or of the calibration system itself with respect to the vehicle. The measurements may include manual measurement (such as with a tape measure) of a relative location of a vehicle with respect to feature of the test bay, or manual measurement of the vehicle with respect to a projection screen and the like. The measurements may include physical horizontal distances or vertical distances off of, for instance, a floor in the bay. In some instances, manual measurements are made with respect to an arbitrarily placed target that, when positioned in the test bay, provide feature(s) that themselves must be measured for relative location in order to determine a relative location of the vehicle with respect to the test bay. Measurements are made by a technician and manually transcribed into a computer system that performs the calibration. However, such systems can be time consuming, cumbersome, and can be prone to human error, as there can be any number of measurements that must be performed and then transcribed to the computer to determine the vehicle's relative position.

Thus, there is a need for an improved ADAS.

BRIEF SUMMARY

According to one aspect, a calibration system for calibrating an optical sensor on board a vehicle. The system includes a control unit, a projection screen having a projection surface positionable within a test station and viewable by an optical sensor positioned in a vehicle, the projection surface electrically coupled to the control unit, and a graduated mounting bar having gradations indicative of a lateral position of the graduated mounting bar. A first target is positionable on a first hub of the vehicle, a second target positionable on a second hub of the vehicle, a first laser mounted to the graduated mounting bar and positionable left to right with respect to the vehicle and along the graduated mounting bar, the first laser electrically coupled to the control unit, the first laser configured to obtain a first distance to the first target along a first axis, and a second laser mounted to the graduated mounting bar and positionable left to right with respect to the vehicle and along the graduated mounting bar, the second laser electrically coupled to the control unit, the second laser configured to obtain a second distance to the second target along a second axis. The control unit is configured to automatically obtain the first distance from the first laser, obtain the second distance from the second laser, obtain a lateral distance from the first laser to the second laser along a third axis that is orthogonal to the first axis and to the second axis, and based on the gradations, and calibrate the optical sensor based on the obtained first distance, the second distance, and the lateral distance.

According to another aspect, a method of calibrating an optical sensor on board a vehicle, includes positioning a vehicle in a test station and proximate a projection surface, the vehicle having an optical sensor, the projection surface in view of the optical sensor, positioning a first target on a first hub of the vehicle, and positioning a second target on a second hub of the vehicle. The method further includes positioning a first laser left to right, the first laser mounted on a graduated mounting bar that is in front of the vehicle, the graduated mounting bar having gradations indicative of a lateral position of the first laser on the graduated mounting bar, the first laser configured to obtain a first distance to the first target along a first axis, positioning a second laser left to right, the second laser mounted on the graduated mounting bar, the second laser configured to obtain a second distance along a second axis to the second target based on a position on of the second laser on the graduated mounting bar, obtaining the first distance from the first laser, obtaining the second distance from the second laser, obtaining a lateral distance along a third axis from the first laser to the second laser based on the gradations, the third axis orthogonal to the first axis and to the second axis, and calibrating the optical sensor based on the obtained first distance, the second distance, and the lateral distance.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
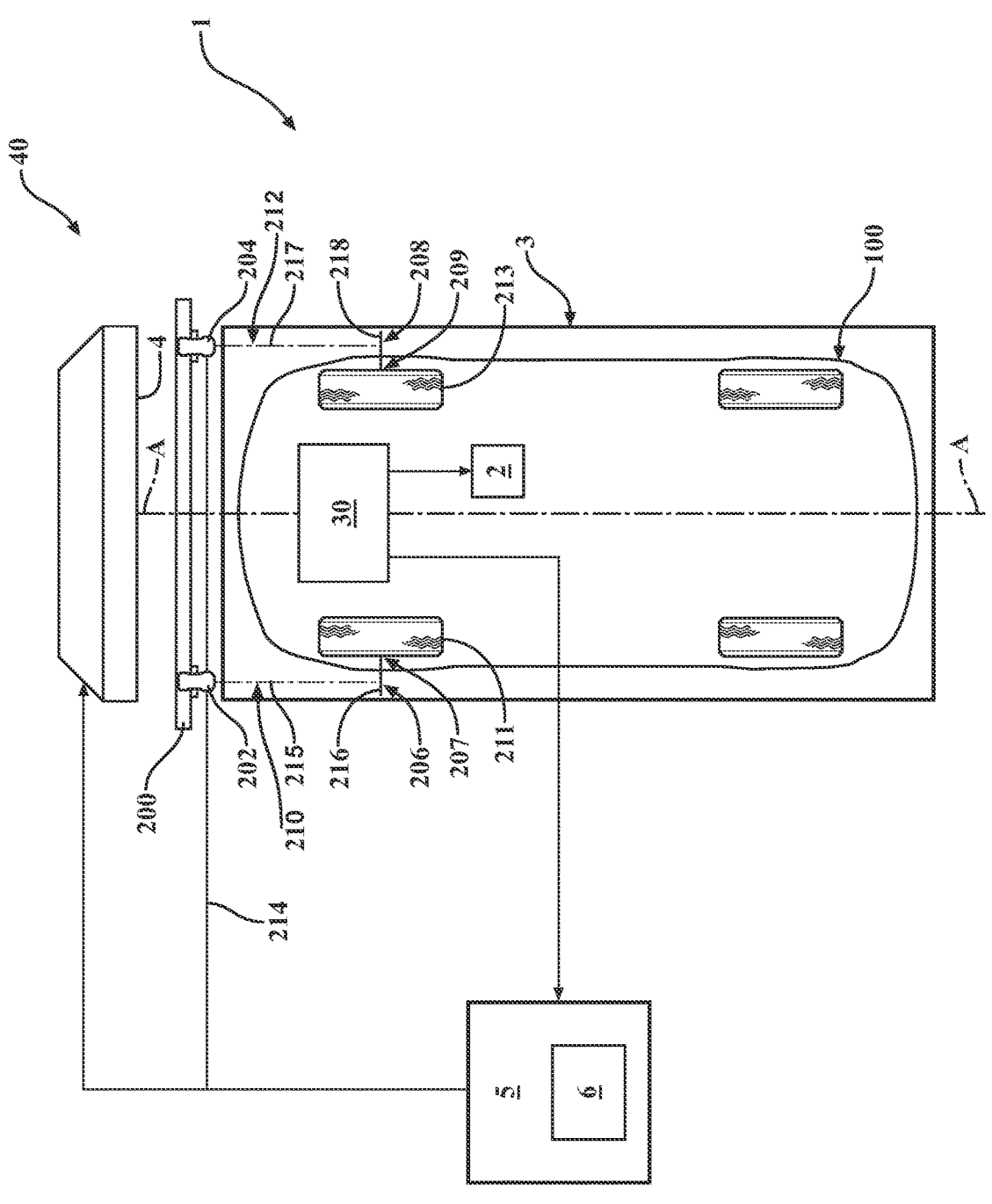
FIG. 1 schematically illustrates a system of calibrating an optical sensor mounted on board of a vehicle, according to an embodiment.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included as part of the disclosure. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Two types of calibration are typically performed in the aftermarket: static and dynamic.

Static calibration is performed in a closed environment (generally the workshop) through a portable device—known in the sector as a "scan tool"— connected to the vehicle's EOBD (European On Board Diagnostic) diagnostic socket and using specific target panels for each type of sensor (e.g. photo camera, radar, Lidar, etc.) usually placed on the front of the stationary vehicle (they can also be positioned on the side or the rear of the vehicle). An example of such a calibration method is proposed in patent US 2013/0325252.

The main criticality of the static calibration methods known to date is connected with a wide variety of parameters at stake. As manufacturers typically include ad hoc calibration settings for each vehicle model and for each type of sensor, workshops are generally affiliated to only some manufacturers, for which they are typically equipped with the related target panels (numerous ones as they differ in terms of shape, size and pattern).

Furthermore, for reliable calibration, it is important to correct transverse and longitudinal alignment of the target panels with respect to the vehicle. At each calibration, the panel alignment step can take a long time.

The movement of the panels also includes special care to prevent damage and breakages.

In fact, the panels are made of plastic material, generally forex, and have a significant extension with respect to the thickness, which is reduced (usually max 5 mm).

Furthermore, static calibration typically does not take place outdoors so there is a well-defined contrast of the panels.

For some types of vehicles, static calibration is not sufficient, so an on-road test is desired.

In that case, dynamic calibration methods are applied, i.e., performed while driving the vehicle. Two scenarios are possible:

1) dynamic calibration performed automatically by the vehicle systems while a generic driver is driving, and 2) dynamic calibration using a scan tool connected to the vehicle's EOBD diagnostic socket for performing specific calibration procedures established by the manufacturer, performed by an authorized repairer.

One problem with dynamic calibration is the fact that it is desirable to be performed under good weather conditions, with possible planning difficulties due to time availability of the vehicle, technicians, etc. . . . A second problem is regarding the need to provide paths with determined characteristics (e.g., horizontal signage, vertical signage, etc.) for performing the calibration.

Furthermore, during dynamic calibration the vehicle could have unexpected reactions (precisely due to calibration errors), which can put the driver's safety at risk.

The aftermarket calibration methods known to date (static and dynamic) typically include long performance times to guarantee the reliability of the results.

From US 2018/100783 it is already known a calibration system for optical sensors using a screen or other projection surface disposed within the field of view of an optical sensor system onboard a vehicle. From WO 2018/067354 it is disclosed an ADAS calibration support structure in which it is possible to project indicia on a screen and to correct parallax distortion by means of mechanical rotation of a laser emitter.

From WO 2014/192347 it is also known an inspection system for an optical sensor. In U.S. Pat. No. 9,247,222 a projection display for images is disclosed, that may be applied to a vehicle. In DE 10 2006060 553 there is disclosed a method for testing a motor vehicle driver assistance system.

In this context, the technical task underpinning an embodiment is to provide a system and method of calibrating an optical sensor mounted on board of a vehicle, that obviate the above-cited drawbacks.

In particular, one embodiment provides a universal system of calibrating an optical sensor mounted on board of a vehicle, i.e. that can be used for the sensors of any vehicle, regardless of the manufacturer, the specific model and the ADAS being implemented and, at the same time, more reliable and compact with respect to known solutions.

An embodiment provides a method for calibrating an optical sensor mounted on board of a vehicle that can be performed in a shorter time and more easily with respect to the calibration methods known to date.

A further embodiment provides a system and method of calibrating an optical sensor mounted on board of a vehicle, which are reliably applicable also to vehicles that normally include an on-road test, i.e. dynamic calibration.

The stated technical tasks are substantially achieved by a system of calibrating an optical sensor mounted on board of a vehicle, including a test station for the stationary vehicle, a projection surface for images or videos, which is located in front of the test station, at least one memory containing a plurality of images and/or videos archived by type of optical sensor, a calibration unit for calibrating the optical sensor configured to adjust the position of the optical axis of the optical sensor, and a control unit which, in response to a signal representing the type of the optical sensor. The control unit is configured to search in the memory for at least one image or video archived in association with the type of optical sensor, command the projection onto the projection surface of the image or video found in the memory or a processed version of the image or video, and interface with the calibration unit.

In accordance with one embodiment, the control unit is also configured to determine, in response to the signal representing the type of optical sensor, a spatial position of the projection surface with respect to the optical sensor mounted on board of the vehicle arranged in the test station.

In accordance with one embodiment, the control unit is also configured to adapt or deform the image or video found in the memory to the dimensions of the projection surface, in response to the signal representing the type of optical sensor.

In accordance with one embodiment, the calibration system further includes a screen or monitor located in front of the test station, the projection surface being the display of said monitor.

In accordance with one embodiment, the calibration system further includes a television set, said monitor being the monitor of said television set.

In accordance with one embodiment, the calibration system further includes a multimedia interactive board, said monitor being the monitor of the multimedia interactive board.

In accordance with one embodiment, the calibration system further includes a computer, said monitor being the monitor of the computer.

In accordance with one embodiment, the projection surface is obtained from a sheet made of PVC.

In accordance with one embodiment, the calibration system further includes a projector or a luminous board, said control unit being configured to command the projector or luminous board to project the image or video found in the memory onto the projection surface.

Preferably, in response to the signal representing the type of optical sensor, the control unit is configured to project a set of parameters or initial calibration conditions onto said projection surface.

The calibration system also includes an automatic means for adjusting the spatial position of the projection surface with respect to the test station.

The stated technical task and specified objects are substantially achieved by a method of calibrating an optical sensor mounted on board of a vehicle, including the steps of positioning the vehicle in a test station, arranging a projection surface for images or videos in front of said test station, identifying the type of optical sensor, selecting in a memory an image or video associated with the type of said optical sensor, projecting the image or video selected or a processed version thereof onto the projection surface, and adjusting the position of the optical axis of the optical sensor starting from said projected image or video.

In accordance with one embodiment, the calibration method further includes a step of determining, according to the type of optical sensor, a spatial measurement position that the projection surface assumes with respect to the optical sensor during calibration.

In accordance with one embodiment, the calibration method further includes a step of adapting or deforming the image or video selected based on the size of the projection surface and the distance from the optical sensor.

Further characteristics and advantages will become more apparent from the indicative and thus non-limiting description of a preferred, but not exclusive, embodiment of a system and method of calibrating an optical sensor mounted on board of a vehicle, as illustrated in the accompanying drawings.

With reference to the figures, a calibration system 1 of calibrating includes an optical sensor 2 mounted on board of a vehicle 100, in particular a motor vehicle such as an automobile, a bus, a lorry, a road tractor, a tractor trailer, an articulated lorry, a farm machinery, a working vehicle, a self-propelled vehicle, etc.

As one example, optical sensor 2 is a CMOS or CCD type sensor of a television camera installed on vehicle 100.

Calibration system 1 includes a test station 3 for stationary vehicle 100, and a projection surface 4 for projecting images or videos. Test station 3 included a horizontal or inclined support zone for supporting vehicle 100. Stationary vehicle 100 is arranged in test station 3 according to techniques and as known, which are not the subject matter this disclosure.

Figure 2:
FIG. 2 illustrates an arrangement of a vehicle in a test station and a projection surface of the calibration system of FIG. 1, in a perspective view, in which the projection surface projects a pattern.
Figure 3:
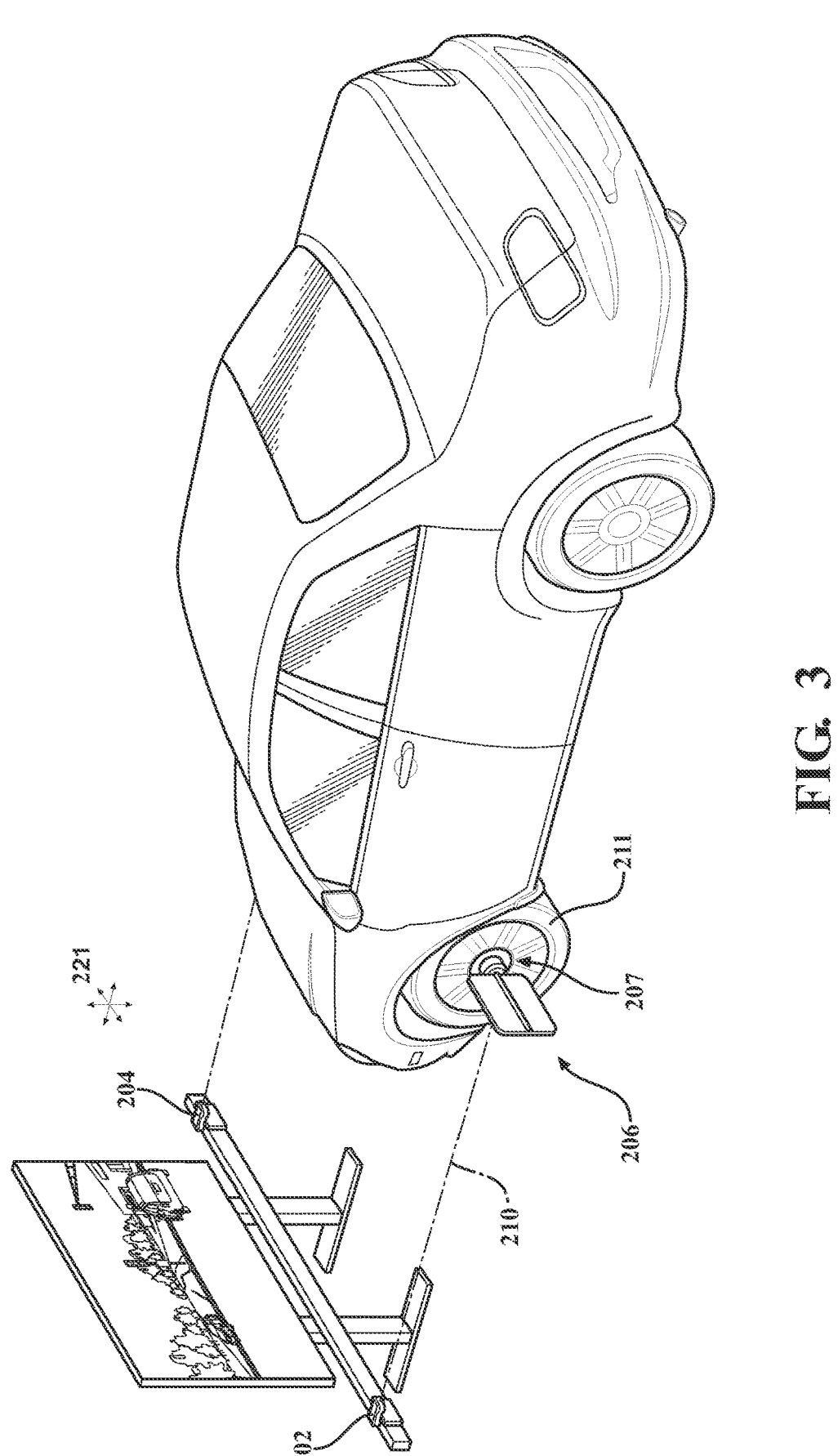
FIG. 3 illustrates an arrangement of a vehicle in a test station and a projection surface of the calibration system of FIG. 1, in a perspective view, in which the projection surface projects a photo or video.

Projection surface 4 is arranged in front of test station 3 so that optical sensor 2 can acquire images or videos projected onto such projection surface 4. In one example, projection surface 4 is rectangular shaped. In one example, calibration system 1 includes a screen or monitor, whose display constitutes projection surface 4. The monitor including projection surface 4 may be a monitor of a television set 40, as illustrated in FIGS. 2 and 3.

In one example, the monitor of the television set 40 may be plasma, liquid crystal, OLED. In one example, a television set 40 can be used with a 65" or greater anti-glare monitor. Alternatively, the monitor comprising the projection surface 4 is the monitor of a multimedia interactive whiteboard (often indicated by the acronym IWB), or the monitor of a computer.

In accordance with another embodiment, calibration system 1 comprises a projector or a video projector or a luminous board that projects images or videos onto projection surface 4, preferably made of (polarised or lenticular) high-contrast PVC fabric. For example, projection surface 4 is the surface of a fabric sheet which when unrolled and taut, has a planarity of +/−2 millimetres per linear metre. Preferably, the fabric is opaque white so as to have a good contrast. Calibration system 1 includes a control unit 5 which receives at least one input signal (indicated as S1) representing the type of optical sensor 2. In response to such signal S1, the control unit 5 is configured for selecting an image or a video in a memory 6, and for commanding the projection onto the projection surface 4 of the image or video selected or a processed version thereof.

In particular, memory 6 is part of calibration system 1 and contains a plurality of images and/or videos archived by type of optical sensor. In fact, on board of vehicle 100, different television cameras, stereo pairs etc. can be installed. Each of such devices has optical sensors of different types that together form an ADAS. Above all, according to the manufacturer and the model, vehicle 100 has its own ADAS, therefore each optical sensor includes ad hoc calibration.

The selection of the image or video by control unit 5 is performed by searching in memory 6 for at least one image or video that is archived in association with the type of that particular optical sensor 2 subject to calibration. For example, the image projected onto projection surface 4 can reproduce the shape, size and pattern of a target panel for the calibration of a specific optical sensor. In the case of a video, it is possible to display a real dynamic scenario or a simulated one, which reproduces an on-road test of the vehicle. For example, control unit 5 is housed in a portable device 20 (generally known in the sector as a scan tool) which can be connected to an EOBD diagnostic socket 31 of vehicle 100.

In one example, memory 6 can be housed in the same portable device 20. Alternatively, memory 6 may be the computer memory, or an external memory (e.g., USB memory connectible directly to television set 40).

If projection surface 4 is composed of the fabric sheet, then control unit 5 is configured to command the projector or video projector or luminous board to project the image or video onto such projection surface 4.

Preferably, in a preliminary step it is necessary to configure calibration system 1. For this reason, control unit 5 is configured to project onto projection surface 4 a set of parameters or initial calibration conditions, in response to the signal S1 representing the type of optical sensor 2.

The calibration of optical sensor 2, meaning the adjustment of the position of the optical axis, takes place by a calibration unit 30 that interfaces with the control unit 5. Calibration unit 30 is preferably part of an electronic control unit for vehicle 100 and calibration unit 30 interfaces with control unit 5 of scan tool 20 through the connection to EOBD diagnostic socket 31.

In accordance with one embodiment, control unit 5 is also configured to determine a spatial position of projection surface 4 with respect to optical sensor 2 mounted on board of vehicle 100 arranged in test station 3. Such determination is performed based on the signal S1 representing the type of optical sensor 2.

Preferably, calibration system 1 also includes an automatic means for adjusting (i.e., regulating) the spatial position of projection surface 4 with respect to test station 3, which is known type and will not be described further. The position adjustment of projection surface 4 is usually used in the event in which vehicle 100 is placed on a horizontal support surface.

In accordance with another embodiment, control unit 5 is also configured to process the images or videos resident in memory 6. In particular, control unit 5 is configured to adapt or deform the selected image or video to the size of the projection surface 4. Such adaptation is performed in response to the signal S1 representing the type of optical sensor 2.

For example, if vehicle 100 in test station 3 is placed on an inclined plane, the image or video is to be deformed rather than adjusting the spatial position of projection surface 4 with respect to optical sensor 2. For example, the support plane for vehicle 100 is inclined forwards by a maximum of 1° with respect to the horizontal. Or, as another example, the support plane for vehicle 100 is inclined backwards by a maximum of 3° with respect to the horizontal.

It is also envisaged that control unit 5 is configured to perform both a determination of the spatial position of projection surface 4 with respect to optical sensor 2 mounted on board of vehicle 100 in test station 3 and a deformation of the selected images or videos. In that case, the determination of the spatial position is rough, and is performed from a deformed projection of the image or video.

The method of calibrating an optical sensor mounted on board of a vehicle, according to an embodiment, is described below.

First, vehicle 100 is parked in test station 3, according to known techniques, as already mentioned above. Projection surface 4 (e.g., the display of a monitor) is arranged in front of test station 3 and is transverse to the longitudinal axis AA of vehicle 100, as seen in FIG. 1. The operator then connects portable device 20 (scan tool) to EOBD diagnostic socket 31 of vehicle 100.

Portable device 20 has a screen 21 on which a graphical interface is displayed, configured to allow text or instructions to be entered by an operator. In particular, the operator can select which vehicle 100 to be calibrated, by choosing from different types of vehicles split into brands (manufacturers) and models. Alternatively, portable device 20 performs such selection automatically or semi-automatically, asking the operator to confirm that vehicle 100 detected is the correct one.

The operator also selects the ADAS to be calibrated, specifically which optical sensor 2 to be calibrated. Also in this case, the selection can take place manually, automatically or semi-automatically. These detection or selection steps of vehicle 100 and of the type of optical sensor 2 to be calibrated are known in themselves and therefore are not the subject matter of this disclosure.

Once the type of optical sensor 2 has been identified, control unit 5 (in scan tool 20) can determine the spatial measurement position that the monitor assumes with respect to optical sensor 2 during calibration. Such determination takes place, for example, in the case of vehicle 100 placed on a horizontal support surface. The spatial measurement position is preferably displayed in the form of instructions on projection surface 4.

It is known that the mutual position of the optical sensor and its target (in this case the display or, in general, the projection surface) is adjusted according to the type of optical sensor and the position that it occupies in vehicle 100. Preferably, other parameters or initial calibration conditions are also projected onto projection surface 4.

The operator then manually adjusts projection surface 4 until the latter assumes the spatial measurement position. Alternatively, the adjustment of the position of projection surface 4 takes place automatically. Once this adjustment has been performed, the operator confirms to portable device 20 (still through the graphical interface that can be loaded onto its screen 21) that the preliminary step has been performed and the actual calibration can take place. The operator can choose whether to perform a calibration with a static image or a dynamic video.

Control unit 5 searches inside memory 6 for the image (in the former case) or the video (in the latter case) associated with the type of optical sensor 2 to be calibrated. The image or video selected can then be displayed on the projection surface 4. Once the target (which in this case is projection surface 4) has been adjusted and the image or video has been projected, the calibration is performed by calibration unit 30 which communicates with scan tool 20. The actual calibration, meaning the adjustment of the position of the optical axis of optical sensor 2, takes place according to an algorithm of the known type.

Once optical sensor 2 has been calibrated, the operator can easily repeat the aforesaid method for other optical sensors located on board of vehicle 100. Alternative to the determination of the spatial position that projection surface 4 has, and its subsequent adjustment, it is possible to project a deformed image or video onto projection surface 4. Such solution, used in particular when vehicle 100 is on a horizontal support surface, is particularly advantageous because it prevents having to adjust the position of projection surface 4.

Finally, it is also possible to adopt a combined solution, in which the spatial adjustment is performed on both the position of projection surface 4 and a projection of the deformed image/video.

A similar calibration system may also be applied for the calibration of a radar mounted on board of a vehicle, i.e., a frontal radar.

According to prior art solutions, the calibration of the frontal radar is achieved by means of a plane reflector arranged at a certain distance D from the radar and perpendicular to the axis of the radar. Usually, the manufacturers declare a certain tolerance ΔD range for the distance D, i.e., D±ΔD, in the arrangement of the plane reflector with respect to the radar. Nevertheless, it is well-known in this field that a deviation, even of a few degrees, in the orthogonal arrangement of the plane reflector with respect to the radar can result in failure of the calibration.

Applying to the frontal radar a system and the method similar proposed herewith for the optical sensor, the user simply places the plane reflector in front of the radar at the distance D recommended by the manufacturer, then he inserts the relevant distances obtained by means of laser meters, and the system calculates the magnitude of the angle that the plane reflector needs to be rotated. Furthermore, the system indicates to the user whether and of which amount the plane reflector shall slide right or left to be centred with respect to the radar. In practice, in the calibration of a radar, the radar substitutes optical sensor 2, while the plane reflector substitutes projection surface 4.

The characteristics and the advantages of the system and method of calibrating an optical sensor mounted on board of a vehicle, according to an embodiment, are clear, as are the advantages. In particular, the use of a surface onto which the images are projected prevents the storage or delicate handling in the workshop of numerous target panels having different shapes, sizes, and patterns. In the solution using a screen, e.g. of a television set, the calibration system proposed herein further allows a contrast to be achieved that is also compatible with use in an open environment.

Furthermore, the screen also allows videos that reproduce real dynamic or simulated scenarios to be projected. Therefore, even for static calibration (i.e. with the vehicle stationary), comparable performance levels are obtained to those of dynamic calibration, which can therefore be prevented for vehicles which usually include an on-road test. Preventing the on-road test simplifies planning (connected with weather and road conditions) and prevents risks for the driver.

The method and system disclosed can also be used in the event of inclination of the vehicle (within certain limits) because it is sufficient to suitably deform the image/video to be projected onto the screen instead of performing the spatial adjustment of the screen with respect to the vehicle.

In addition, in case of calibration of the radar, the user may save, as an example, up to 20 minutes times for each vehicle.

The disclosed ADAS measures the relative position of the vehicle undergoing calibration and of the calibration frame showing targets for sensors to be calibrated (i.e., cameras or radars). And, ADAS in general rely on knowing relative positions as indicated. Thus, the disclosed system and method are applicable to other ADAS than that described herein. And, the disclosed system and method obtains an image of the vehicle's camera target on a screen and adapts this image based on the position of the vehicle (such as when the vehicle is not squarely aligned in the test station, such as test station 3 above). Other known systems, on the other hand, typically obtain external measurements of the vehicle relative to the calibration system to achieve proper alignment.

Thus, according to the disclosure and referring back to FIGS. 1, 2, 3, and 4, calibration system 1 includes a graduated mounting bar 200 that has positioned thereon a first laser 202 and a second laser 204. As will be further described, graduated mounting bar 200 includes physical and/or visual gradations that are picked up by elements (e.g., pickups 241, 243) positioned in mounting structures (e.g., laser mounts 240, 242) for both first and second lasers 202, 204. Calibration system 1 includes a first laser target assembly 206 that is positioned on a left front wheel hub 207 of a left front wheel 211. Calibration system 1 also includes a second laser target assembly 208 that is positioned on a right front wheel hub 209 of a right front wheel 213. As also will be further described, first laser 202 emits a first laser beam 210 along a first axis 215 toward first laser target assembly 206, and second laser 204 emits a second laser beam 212 along a second axis 217 toward second laser target assembly 208. Information, such as first and second distances measured by the mounting structures (e.g., the pickups 241, 243 of the laser mounts 240, 242) off of graduated mounting bar for first and second lasers 202, 204, is conveyed to control unit 5 via a communication line 214. In one example, communication line 214, though illustrated as a physical communication line, instead is made via a wireless communication from lasers 202, 204 to control unit 5, eliminating the need for physical wires to extend therebetween.

Figures 4, 5:
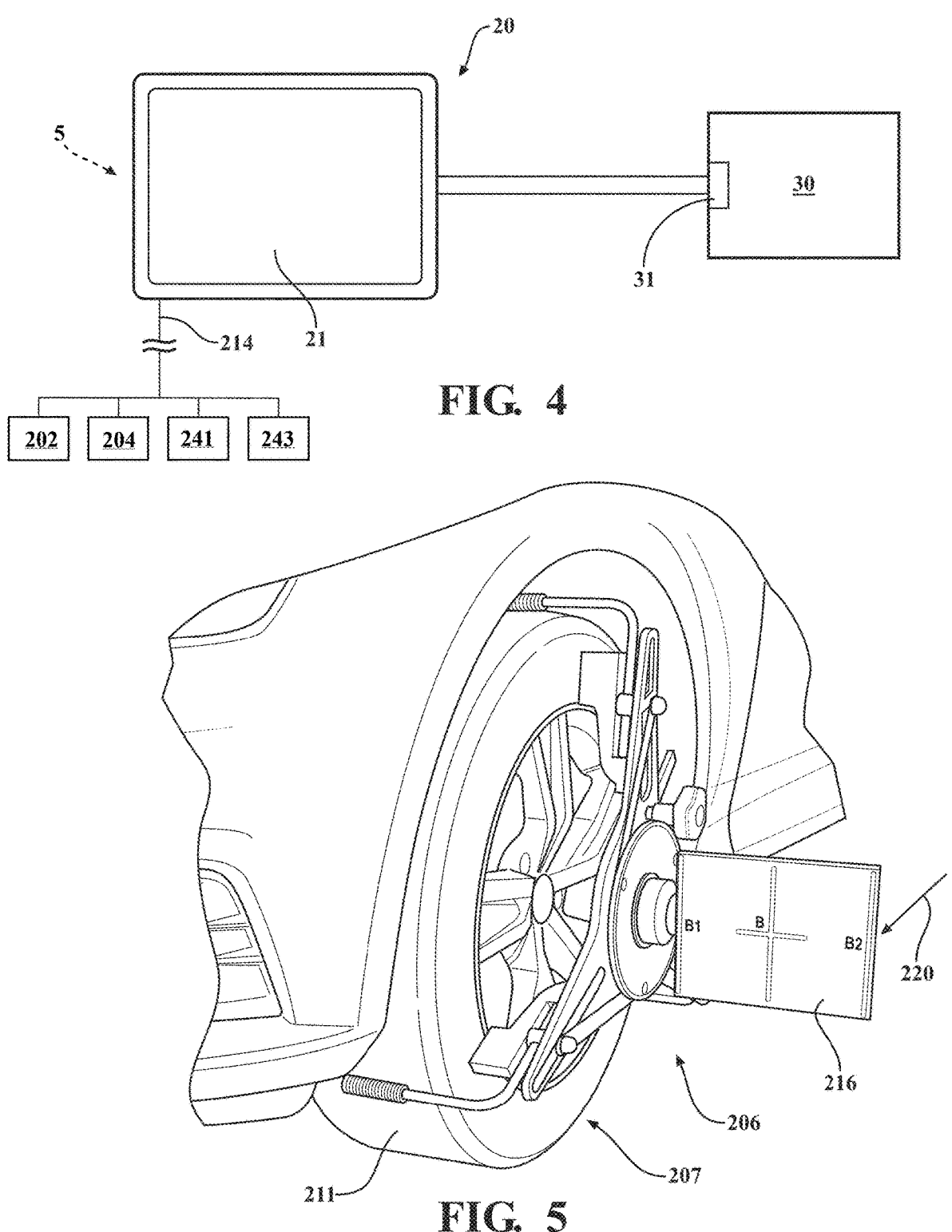
FIG. 4 schematically illustrates the communication between a scan tool and a calibration unit of the calibration system of FIG. 1.
FIG. 5 illustrates a laser target positioned on a hub of the vehicle.
Figure 6:
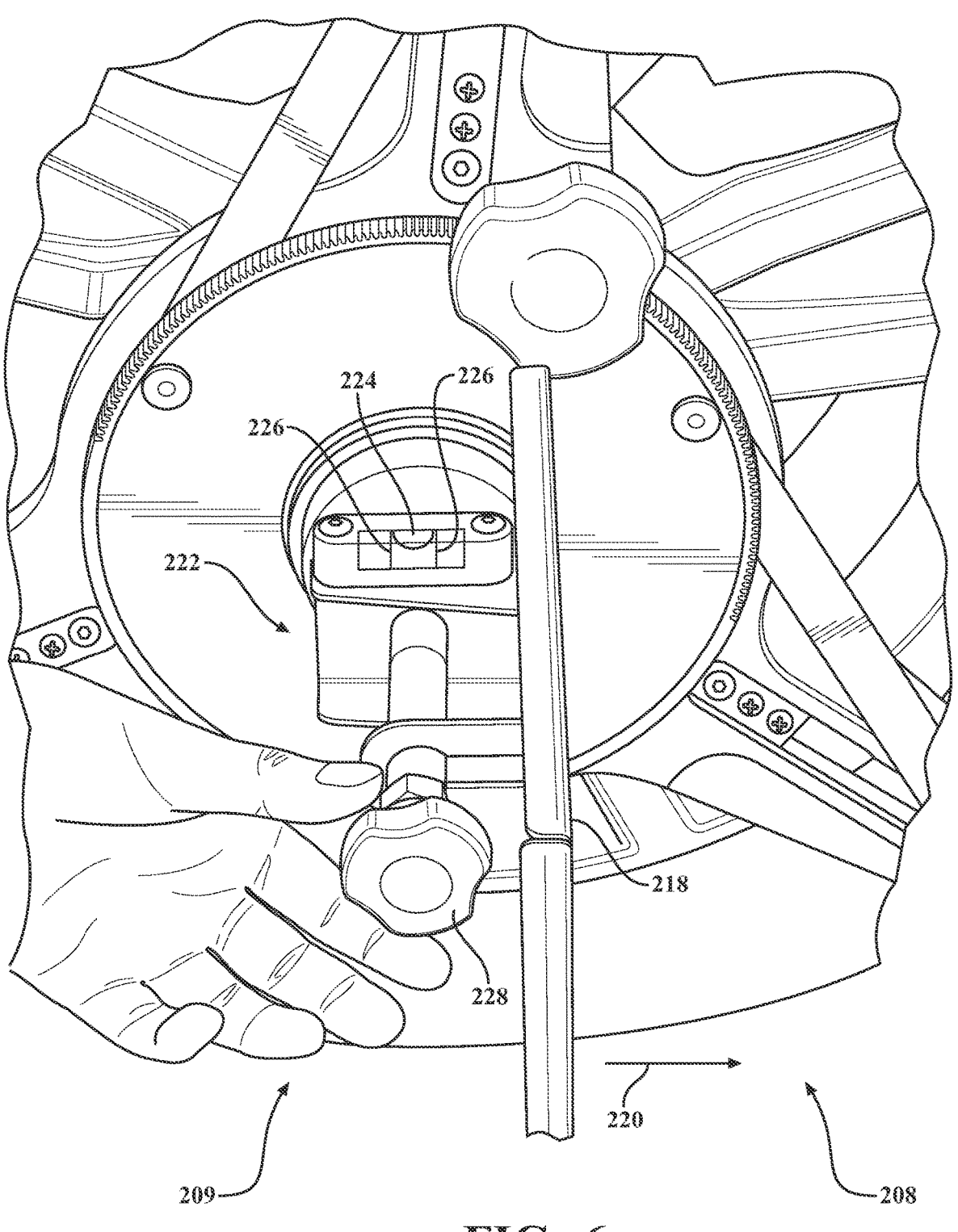
FIG. 6 illustrates placement of the laser target of FIG. 5 on a hub of the vehicle.

Referring now to FIG. 5, first laser target assembly 206 of the previous figures is illustrated, mounted to left front wheel hub 207. The following description applies to both first laser target assembly 206 as well as second laser target assembly 208 illustrated in FIG. 1, noting the obvious differences due to the chirality between left and right assemblies—the left being shown in FIG. 5 and the right shown in FIG. 6. For instance, FIG. 6 is illustrative of alignment of a hub assembly on a wheel hub, but pertains to second laser target assembly 208 mounted on right front wheel hub 209, whereas FIG. 5 pertains to the left side of the vehicle.

Each assembly 206, 208 includes a respective left target 216 and right target 218, with each facing 220 toward a front of the vehicle. Left and right targets 216, 218 are manually adjusted to be vertical by use of a conventional level. For instance, a level 222 may be permanently or temporarily affixed to its respective assembly 206, 208, level 222 including a gas bubble 224 contained within a clear enclosure and having level gradation marks 226 that provide an indication of when level 222 is, in fact, level, via rotation of targets 216, 218 via a rotational handle 228 and, in one example, via a use of a rotational gear or other known elements or assemblies that cause targets 216, 218 to rotate and level via a rotation of a respective handle 228.

Figure 7:
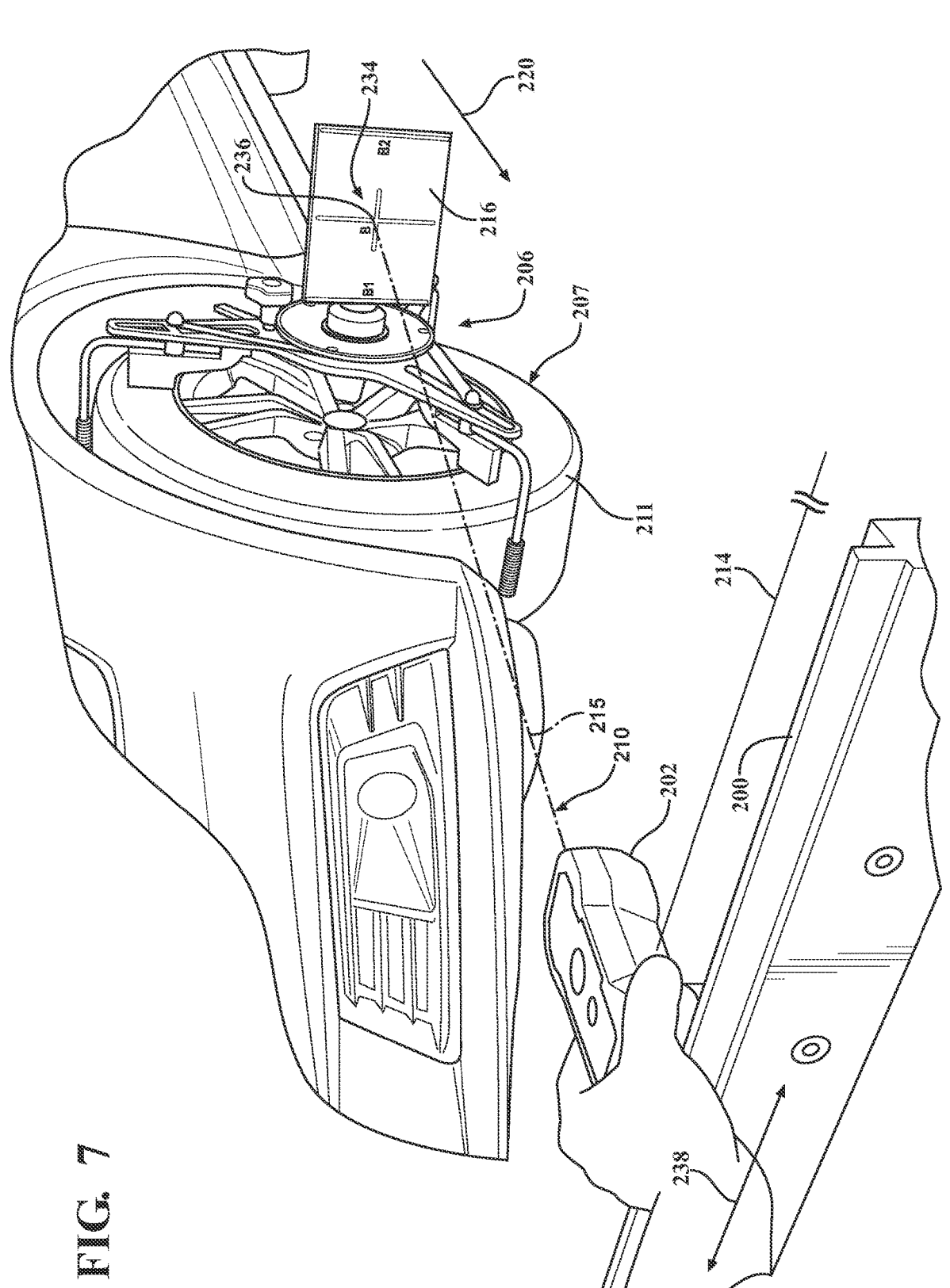
FIG. 7 illustrates use of a laser rangefinder to determine positional information on its mounting structure according to the disclosure.

FIG. 7 illustrates use of a laser rangefinder to determine positional information on its mounting structure according to the disclosure, and with respect to front left wheel 211 and its respective elements described herein. Once left target 216 is vertically adjusted, first laser 202 is activated to emit first laser beam 210 along first axis 215, and first laser 202 is manually moved left/right 238 until first laser beam 210 is directed toward left target 216. Second laser 204 is similarly adjusted left/right and along second axis 217. Incidentally, it is contemplated that reference to "left/right" in the present disclosure refers to both "left to right" as well as "right to left", and generally referring to lateral motion with respect to the vehicle and also along graduated mounting bar 200. Distances thereby corresponding with laser beams 210, 212 are thereby determined once each laser beam 210, 212 is directed toward its respective target 216, 218 and via operation of each laser 202, 204. In one example the distance measurements for laser beams 210, 212 are automatically determined once lasers 202, 204 are placed, being automatically determined by an operator directing the measurements to be made by, for example, triggering a "read" command during execution of the calibration steps.

As will be further described, the location in 3-space (i.e., in frame of reference 221) of first laser 202 is known, both vertically and transversely. Such knowledge derives from its position on the known (i.e., pre-measured) graduated mounting bar. More specifically, a vertical elevation 239 of graduated mounting bar 200 is known and established in its configuration in test station 3. Graduated mounting bar 200 is pre-set to be parallel with the floor of test station 3, and as first laser 202 is moved left/right 238 its elevation with respect to vehicle is known and remains constant.

Figure 8:
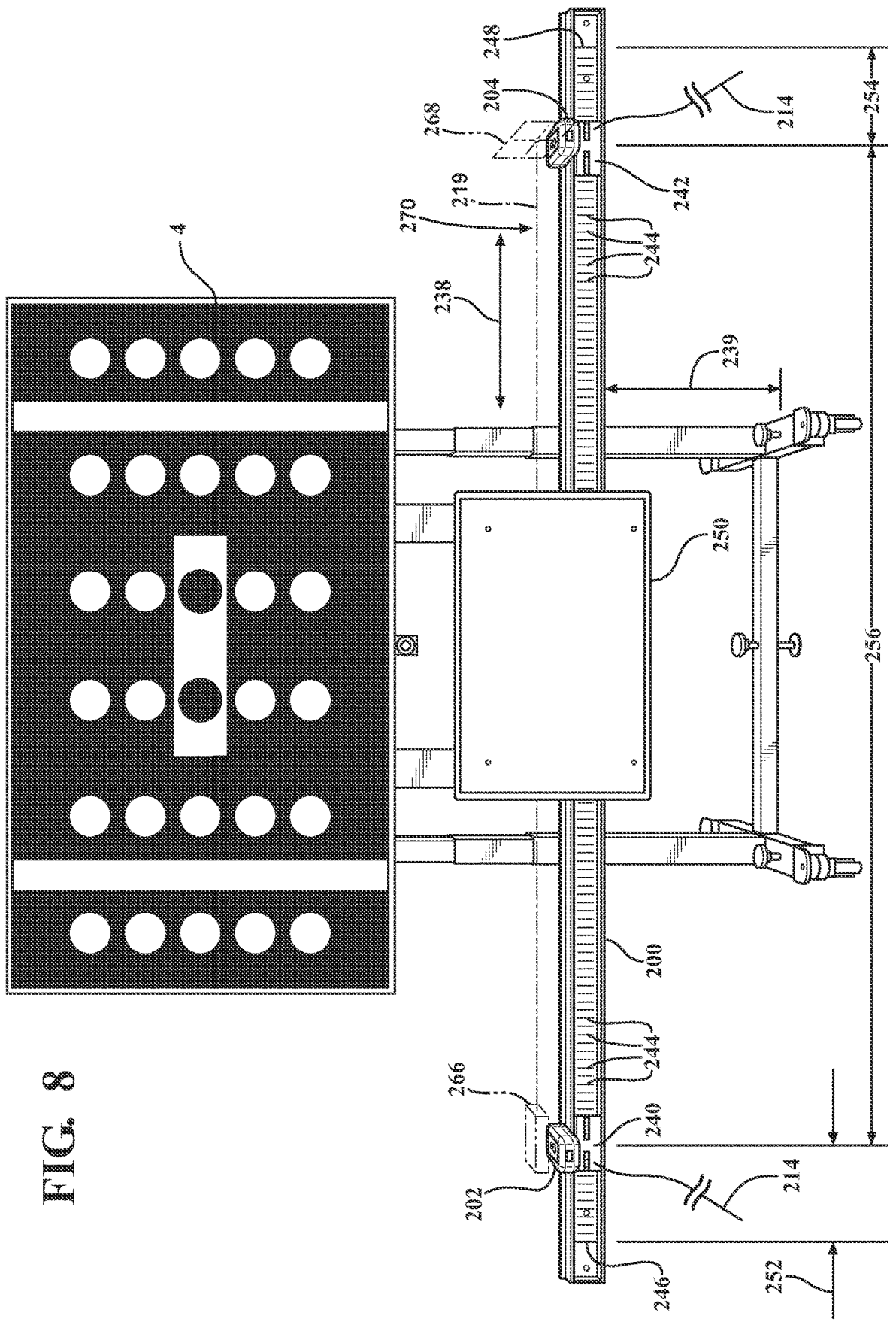
FIG. 8 illustrates a front view of the projection surface and including other aspects of the disclosed calibration system.

And, as further illustrated in FIG. 8, first laser 202 is mounted to graduated mounting bar 200 and its lateral location is known due to gradations (i.e., visible markings or physical breaks in the surface of graduated mounting bar 200) and due to "pickups" that are affiliated with first laser 202. As such, lateral locations of first laser 202 are known and transmitted via communication line 214 from first laser 202 to control unit 5, as first laser 202 is moved left/right 238. As indicated above, line 214 may be via a physical connection, or may be a wireless communication such as via Bluetooth or other known wireless systems.

Referring still to FIG. 8, lasers 202, 204 are mounted to graduated mounting bar 200 via a first laser mount 240 and a second laser mount 242. Laser mounts 240, 242 serve at least two purposes: to allow left/right motion 238 of each laser 202, 204 while they remain affixed to graduated mounting bar 200, while moving along graduated mounting bar 200, to provide a measurement of a latter location of each laser 202, 204. Graduated mounting bar 200 includes gradations 244 that can be visibly, electrically, magnetically, or mechanically "picked up" via mounts 240, 242. Gradations 244 may be affixed or marked onto graduated mounting bar 200 at fixed intervals, and as each laser 202, 204 is moved left/right 238, pickups 241, 243 within or affixed respectively to laser mounts 240, 242 sense and are configured to provide a count of the number of gradations passed (or use other indicators of distance as lasers 202, 204 are moved left/right 238), providing distance measurements that are transmitted to control unit 5 via communication line(s) 214 or via wireless operation (see, e.g., FIG. 4). As indicated, gradations 244 can be visibly, electrically, or mechanically "picked up" via mounts 240, 242, as mounts 240, 242 include pickups 241, 243 for sensing when each of gradations 244 is passed.

According to the disclosure, and as known, the distance measurements transmitted from mounts 240, 242 are relative to one another, and as such absolute measurements are determined based on a zero or a "baseline" measurement for each laser 202, 204 that may be made on graduated mounting bar 200. As one example, graduated mounting bar 200 includes a first zero point 246 corresponding to first laser 202, and a second zero point 248 corresponding to second laser 204. As such, during a calibration procedure each laser 202, 204 may be moved to its respective zero point 246, 248 to be "zeroed out". Given that the locations of zero points 246, 248 are known and fixed on graduated mounting bar 200, the absolute locations of lasers 202, 204 thereby known, as well as the relative distance therebetween. As such, lateral locational measurements of each laser 202, 204 result in known dimensions or measurements 252 and 254 (distances from arbitrary zero points 246, 248), from which relative or lateral distance 256 can be derived along third axis 219, and in one example may be automatically obtained by execution of a "read" command during calibration. That is, 252 is a distance to first laser 202 from zero point 246, 254 is a distance to second laser 204 from zero point 248, and 256 is determined therefrom via known locations of arbitrary locations or zero points 246 and 248 on graduated mounting bar 200. And, it is contemplated that, as indicated, zero points 246 and 248 are arbitrarily located and can be positioned anywhere along graduated mounting bar 200, and then used to determine distance 256 between lasers 202, 204 via the distances determined via the pickups as each laser 202, 204 is moved along graduated mounting bar 200.

And, given the known elevation 239 of each laser 202, 204, the locations of lasers 202, 204 in 3-space is known and with respect to projection surface 4 as well as each of targets 216, 218. That is, in general the physical features of the various components are fixed with respect to one another (i.e., projection surface 4, or by adjusting elevation to a known location for a particular vehicle), and as such the above disclosure results in a known location in 3-space of each of hubs 207, 209 with respect to projection surface 4. Likewise, each vehicle being calibrated in the test bay includes its own specific parameters of its optical sensor 2 with respect to its hubs 207, 209.

Thus, according to the disclosure, the measurements of shifting lasers 202, 204 left/right 238 are picked up via graduated mounting bar 200, and distance measurements via laser beams 210, 212, are automatically uploaded to control unit 5 and/or calibration unit 30 during a calibration procedure. As such, manual transcription of such measurements is avoided.

As shown in FIG. 8, a mirror 250 is likewise included in calibration system 1, for use with respect to laser calibration as well. Furthermore, according to the disclosure and as an alternative, distances between lasers 202, 204 may be measured directly by mounting a laser 266 at the location and on top of laser 202, or in lieu of laser 202, directed toward laser 204. And, a target 268 may be included on top of laser 204 or in lieu of laser 204. As such, a laser beam 270 may also be used to establish a distance therebetween and along a third axis 219. Furthermore, and in general, laser beams are illustrated for example as elements 210, 212, and 270, whereas the corresponding axes along which they project are illustrated respectively as elements 215, 217, and 219. As such, the various distances are determined by directing a laser along their respective axes, and the axes with measured distances are measured these axes (via the laser and directed toward its respective target), all of which are directed toward determining an angle α that defines an angular position of the vehicle in the test bay or station, and with respect to a central frame of reference 221 illustrated in FIGS. 2 and 3 in their perspective views, but also applicable to establish the frame of reference for the test station also in the other figures, defining axes 215/217 and 219, as well as a vertical axis such that angle α for the vehicle is established via the measurements made and as disclosed herein.

Figure 9:
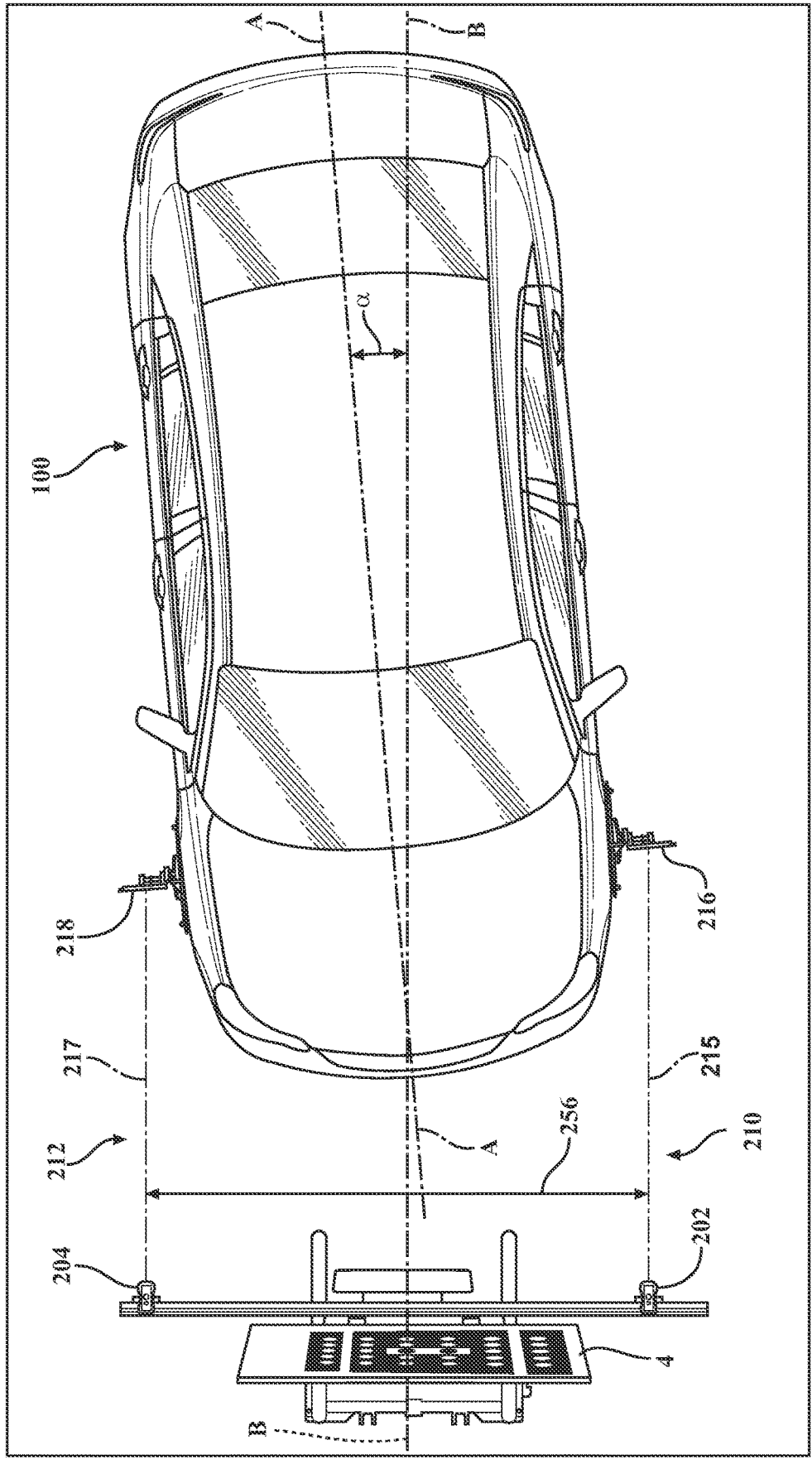
FIG. 9 illustrates a top view of the vehicle and showing obtained distances and misalignment of the vehicle in the test station.

FIG. 9 illustrates a top view of vehicle 100 and showing obtained distances, such as measured distances via laser beams 210, 212, along their respective axes 215, 217 as well as measured or calculated distance 256 as obtained above and along third axis 219, and misalignment of vehicle 100 in test station 3. As understood via the above discussion, vehicle 100 may be positioned on an angle α with respect to a longitudinal axis BB of test station 3, and projection surface 4, as seen in FIG. 9. Thus, although according to the disclosure calibration may be performed by having optical sensor 2 detect a location of the illustrated pattern on projection surface 4 and then correcting sensor 2, such a calibration would not be complete since the angle α of the vehicle in the test station has not been corrected for. As such, according to the disclosure the aforementioned measurements are obtained via both lasers 202, 204 and via the known locations of the lasers 202, 204, as well as known parameters of the test station and the vehicle being calibrated. It is further noted that the measurements obtained herein and to calibrate optical sensor 2 are performed expressly without use of an optical or other device that is used external to the vehicle. That is, once the vehicle is positioned in the test station (having its own reference frame 221), then the location of the vehicle is obtained with respect to the reference frame (to include determination of angle α) such that its orientation with respect to the reference frame 21 can be accounted for when the calibration of the optical sensor is performed using projection surface 4.

As such, angle α and other parameters and/or distances, both laterally and horizontally, may be determined based on the various measurements taken during calibration and as discussed above. A graphical illustration of the primary measurements is shown in FIG. 10, and the various known geometric and trigonometric measurements may be made to perform the translation to obtain correction factors to complete the calibration, such as determining angle α and other distances.

Figure 10:
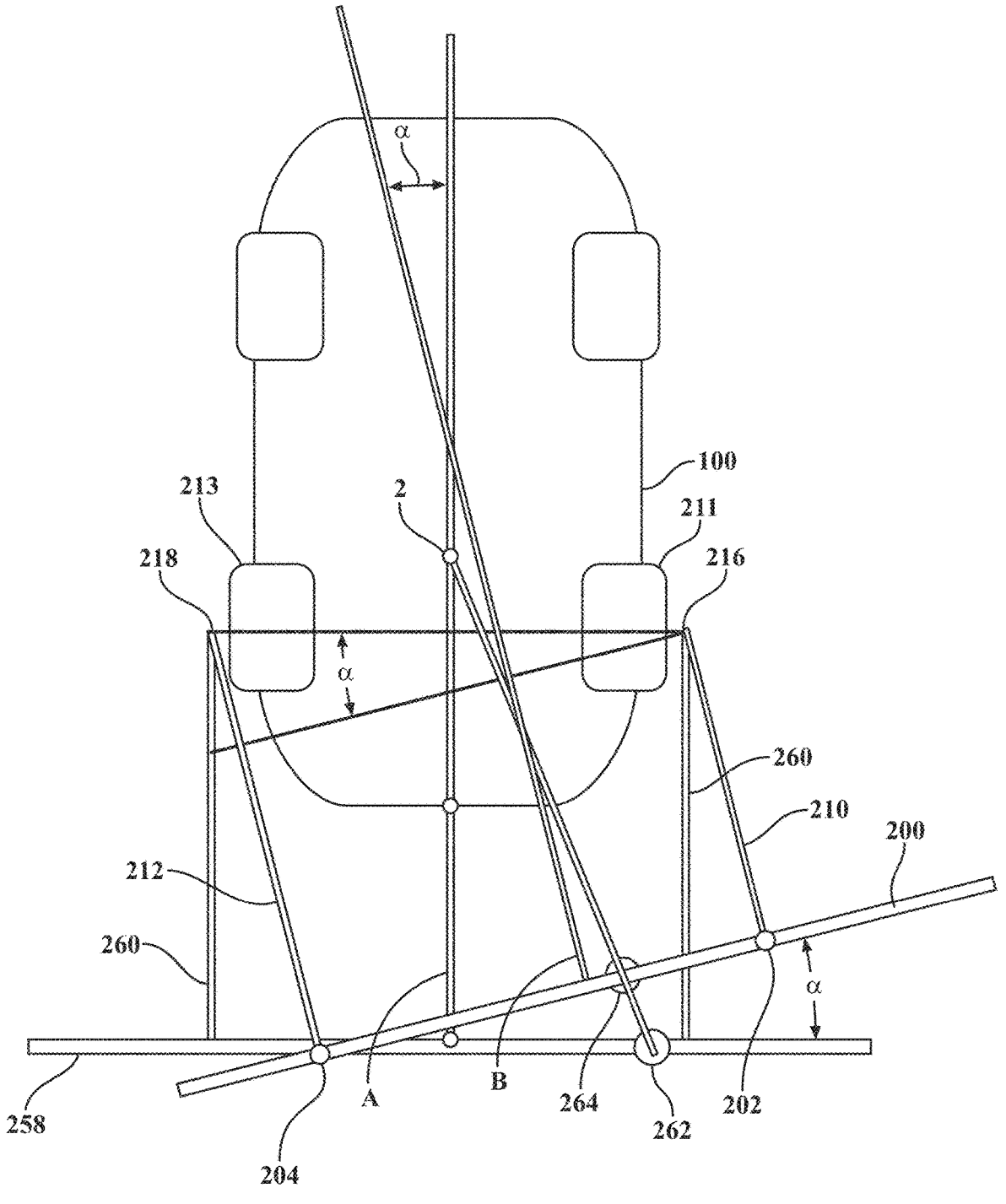
FIG. 10 is a graphical illustration of a keystone effect for correction in the ADAS.

FIG. 10 is a graphical illustration of a keystone effect for correction in the ADAS, according to the disclosure. Vehicle 100 illustrates front wheels 211, 213 having targets 216, 218. Laser beams 210, 212 are shown that correspond to measured distances from graduated mounting bar 200. As illustrated, graduated mounting bar 200 is at an angle α of longitudinal axis of vehicle 100 AA, and with respect to longitudinal axis of test station 3 BB. A distance from optical sensor 2 to graduated mounting bar 200 is obtained via measurements and known parameters of test station 3 and vehicle 100, as well as the measured distance (discussed above) to determine relative positions or distances between lasers 202, 204.

Thus, using known geometric and trigonometric techniques, and the obtained measurements, a mathematical translation to a virtual location of graduated mounting bar 258, and having virtual distance 260 (the same from each laser 216, 218 to the virtual location of graduated mounting bar 258), based on optical sensor 2 "seeing" point 262 based on point 264 on graduated mounting bar 200. Other corrections may be made, as well, based on corrections to the elevations of the targets. Also, it is contemplated that generally an influence of a rotational position of the steering wheel is generally negligible (such as if the wheels are slightly turned with respect to the body of the vehicle), as well as the thrust angle itself and with respect to the body of the vehicle.

Thus, disclosed is a calibration system that calibrates an optical sensor mounted on board of a vehicle that includes a test station consisting of a horizontal or inclined support zone for supporting the vehicle, a projection surface for images or videos, said projection surface being located in front of said test station, at least one memory containing a plurality of images and/or videos archived by type of optical sensor, a calibration unit for calibrating the optical sensor configured to adjust the position of the optical axis of said optical sensor, and a control unit which, in response to a signal representing the type of said optical sensor, is configured to search in said memory for at least one image or video archived in association with the type of said optical sensor, command the projection onto said projection surface of the image or video found in said memory or a processed version of said image or said video, interface with said calibration unit, and adapt or deform the image or video found in said memory to the size of the projection surface.

The calibration system may include a screen or monitor located in front of said test station, said projection surface being the display of said monitor. The calibration system may include a television set, said monitor being the monitor of said television set. The calibration system may include a multimedia interactive board, said monitor being the monitor of the multimedia interactive board. The calibration system may include a computer, said monitor being the monitor of the computer. The calibration may include that the projection surface is obtained from a sheet made of PVC. The calibration system may include a projector or a luminous board, said control unit being configured to command the projector or luminous board to project the image or video found in said memory onto said projection surface. The calibration system may also, in response to the signal representing the type of said optical sensor, have the control unit configured to project a set of parameters or initial calibration conditions onto said projection surface. The calibration system may include a projector or a luminous board, said control unit being configured to command the projector or luminous board to project the image or video found in said memory onto said projection surface.

Also disclosed is a method of calibrating an optical sensor mounted on board of a vehicle, including the steps of positioning the vehicle in a test station consisting of a horizontal or inclined support zone for supporting the vehicle, arranging a projection surface for images or videos in front of said test station, identifying the type of said optical sensor, selecting in a memory an image or video associated with the type of said optical sensor, adapting or deforming the image or video selected in said memory (6) to the size of the projection surface, projecting the image or video selected or the adapted or deformed version thereof onto said projection surface, and adjusting the position of the optical axis of said optical sensor starting from said projected image or video.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A calibration system for calibrating an optical sensor on board a vehicle, comprising:
   a control unit;
   a projection screen having a projection surface positionable within a test station and viewable by an optical sensor positioned in a vehicle, the projection surface operatively coupled to the control unit;
   a graduated mounting bar having gradations indicative of lateral positions on the graduated mounting bar;
   a first target positionable on a first hub of the vehicle;
   a second target positionable on a second hub of the vehicle;
   a first laser mount adjustably mounted on the graduated mounting bar;
   a first laser adjustably mounted on the graduated mounting bar via the first laser mount, the first laser positionable laterally with respect to the vehicle and the graduated mounting bar via moving the first laser mount along the graduated mounting bar, the first laser operatively coupled to the control unit, the first laser configured to obtain a first distance to the first target along a first axis;

a second laser adjustably mounted on the graduated mounting bar and positionable laterally with respect to the vehicle and along the graduated mounting bar, the second laser operatively coupled to the control unit, the second laser configured to obtain a second distance to the second target along a second axis;

wherein the first laser mount includes a pickup configured to sense one or more of the gradations of the graduated mounting bar, the pickup operatively connected to the control unit and configured to provide an indication of a location of the first laser on the graduated mounting bar to the control unit;

the control unit configured to automatically:
    obtain the first distance from the first laser;
    obtain the second distance from the second laser;
    obtain, based on the gradations, a lateral distance from the first laser to the second laser along a third axis that is orthogonal to the first axis and to the second axis; and
    calibrate the optical sensor based on the obtained first distance, the second distance, and the lateral distance.

2. The calibration system of claim 1, wherein the control unit is further configured to establish a frame of reference of the vehicle in the test station, and determine an angle of the vehicle within the frame of reference based on the first distance along the first axis, the second distance along the second axis, and the lateral distance along the third axis, and calibrate the optical sensor based on the determined angle.

3. The calibration system of claim 2, wherein the control unit is further configured to correct for an angular position of the vehicle in the test station based on the first distance along the first axis, the second distance along the second axis, and the lateral distance along the third axis prior to calibrating the optical sensor.

4. The calibration system of claim 3, wherein the control unit is further configured to:
    determine a position of the optical sensor in the frame of reference and with respect to the projection surface;
    select visual content to be displayed;
    display the visual content on the projection surface;
    adapt the visual content displayed on the projection surface to a size of the projection surface based on the size of the projection surface and the position of the optical sensor; and
    calibrate the optical sensor by adjusting a position of an optical axis of the optical sensor based on the visual content.

5. The calibration system of claim 4, wherein the control unit is further configured to select the visual content by selecting a static image from a video.

6. The calibration system of claim 1, wherein the pickup visibly, electrically, magnetically, and/or mechanically senses one or more of the gradations of the graduated mounting bar when the first laser mount is moved along the graduated mounting bar.

7. The calibration system of claim 1, wherein the control unit is external to the vehicle.

8. The calibration system of claim 1, wherein the control unit is further configured to adapt visual content displayed on the projection surface by deforming the visual content to a size of the projection surface.

9. A method of calibrating an optical sensor on board a vehicle, comprising:
    positioning a vehicle in a test station and proximate a projection surface, the vehicle having an optical sensor, the projection surface in view of the optical sensor;

positioning a first target on a first hub of the vehicle;
    positioning a second target on a second hub of the vehicle;
    laterally positioning a first laser with respect to the vehicle via moving a first laser mount along a graduated mounting bar that is in front of the vehicle, the first laser adjustably mounted on the graduated mounting bar via the first laser mount, the graduated mounting bar having gradations indicative of lateral positions on the graduated mounting bar, the first laser configured to obtain a first distance to the first target along a first axis, the graduated mounting bar having a second laser mounted thereon, the second laser configured to obtain a second distance to the second target along a second axis;
    sensing one or more of the gradations of the graduated mounting bar via a pickup of the first laser mount;
    providing, via the pickup, an indication of a location of the first laser on the graduated mounting bar based on the one or more gradations of the graduated mounting bar sensed by the pickup of the first laser mount;
    obtaining the first distance along the first axis from the first laser;
    obtaining the second distance along the second axis from the second laser;
    obtaining a lateral distance from the first laser to the second laser based at least partially on the indication provided by the pickup, the lateral distance extending along a third axis that is orthogonal to the first axis and to the second axis; and
    calibrating the optical sensor based on the obtained first distance, the obtained second distance, and the obtained lateral distance.

10. The method of claim 9, further comprising:
    establishing a frame of reference of the vehicle in the test station;
    determining an angle of the vehicle within the frame of reference based on the obtained first distance along the first axis, the second distance along the second axis, and the lateral distance along the third axis; and
    calibrating the optical sensor based on the determined angle.

11. The method of claim 10, further comprising correcting for an angular position of the vehicle in the test station based on the first distance, the second distance, and the lateral distance prior to calibrating the optical sensor.

12. The method of claim 11, further comprising:
    determining a position of the optical sensor in the frame of reference and with respect to the projection surface;
    selecting visual content to be displayed;
    displaying the visual content of the projection surface;
    adapting the visual content displayed on the projection surface to a size of the projection surface based on the size of the projection surface and the position of the optical sensor; and
    calibrating the optical sensor by adjusting a position of an optical axis of the optical sensor based on the visual content.

13. The method of claim 9, wherein the pickup is configured to visibly, electrically, magnetically, and/or mechanically sense the gradations of the graduated mounting bar.

14. The method of claim 9, further comprising adapting visual content to account for a deviation between a determined position and orientation of the projection surface and the optical sensor with respect to one another and a predefined spatial position of the projection surface and the optical sensor for calibration, wherein the visual content is adapted such that, when the adapted visual content is displayed on the projection surface, the optical sensor perceives the displayed adapted visual content to be the visual content as displayed when the projection screen and the optical sensor are disposed in the predefined spatial position.

15. The method of claim 14, wherein adapting the visual content includes:

adjusting a display location of the visual content on the projection surface; and/or deforming the visual content to account for an angular deviation between i) the determined position and orientation of the of the projection surface and the optical sensor and ii) the predefined spatial position of the projection surface and the optical sensor for calibration.

16. The method of claim 9, wherein the one or more of the gradations of the graduated mounting bar are sensed via the pickup while laterally positioning the first laser with respect to the vehicle.

17. The method of claim 9, wherein sensing one or more of the gradations of the graduated mounting bar includes visibly, electrically, magnetically, and/or mechanically sensing, via the pickup, each gradation of the graduated mounting bar that the first laser and/or the first laser mount passes while moving the first laser mount along the graduated mounting bar.

18. The method of claim 9, wherein providing the indication of the location of the first laser on the graduated mounting bar includes providing, with the pickup, a count indicating a number of the gradations that were passed by the first laser and/or the first laser mount and sensed by the pickup while moving the first laser mount along the graduated mounting bar.

\* \* \* \* \*